United States Patent [19]

Deyle

[11] Patent Number: 4,970,987
[45] Date of Patent: Nov. 20, 1990

[54] METHOD AND APPARATUS FOR COLLECTING AND DISPOSING OF PET EXCREMENT

[76] Inventor: Michael R. Deyle, 6826 S. Bellaire Way, Littleton, Colo. 80122

[21] Appl. No.: 423,989

[22] Filed: Oct. 19, 1989

[51] Int. Cl.$^5$ ............................................. A01D 29/00
[52] U.S. Cl. ...................................... 119/166; 209/374
[58] Field of Search ......................... 119/1, 15; 209/374

[56] References Cited

U.S. PATENT DOCUMENTS

| | | | |
|---|---|---|---|
| 3,141,441 | 7/1964 | Russell | 119/1 |
| 3,796,188 | 3/1974 | Bradstreet | 119/1 |
| 3,908,597 | 9/1975 | Taylor | 119/1 |
| 4,047,499 | 9/1977 | Janecek | 119/1 |
| 4,217,857 | 8/1980 | Geddie | 119/1 |
| 4,325,822 | 4/1982 | Miller | 209/251 |
| 4,359,966 | 11/1982 | Casino | 119/1 |
| 4,505,226 | 3/1985 | Carlson | 119/1 |
| 4,709,827 | 12/1987 | Jaillet et al. | 119/1 |
| 4,802,442 | 2/1989 | Wilson | 119/1 |
| 4,817,560 | 4/1989 | Prince et al. | 119/1 |
| 4,870,924 | 10/1989 | Wolfe | 119/1 |

Primary Examiner—John Weiss
Attorney, Agent, or Firm—Brian D. Smith

[57] ABSTRACT

An animal waste collection and disposal device for separating animal waste matter from granular litter material is disclosed. The device includes first and second sections, each of which has apertures which are sized and configured to permit the passage of granular litter material but substantially prevent the passage of waste matter. The first and second sections are connected by a connecting means which pivotally and slidably connects the first section to the second section so that the sections are capable of pivoting relative to each other between an open position and a closed position and slidably moving relative to each other between the closed position and a waste matter dumping position. An animal waste collection and disposal apparatus including the aforementioned device and a litter box specially designed for use with the device is also disclosed. In addition, a method of using the device to separate animal waste matter from granular litter material and disposing of the animal waste matter is also disclosed.

19 Claims, 3 Drawing Sheets

METHOD AND APPARATUS FOR COLLECTING AND DISPOSING OF PET EXCREMENT

TECHNICAL FIELD

The invention relates generally to litter boxes and, more particularly, to litter box arrangements for separating solid pet excrement from the granular litter material to permit reuse of the litter material.

BACKGROUND ART

One of mankind's greatest challenges has been the design of an odorless litter box which does not have to be cleaned very often but is easy to clean when such is necessary. This challenge is documented by the issuance of literally hundreds of patents over the years for new types of litter boxes and litter box apparatus. As a result of this effort, granular kitty litter material was developed to reduce the odors associated with pet waste and to make it easy to clean a litter box. While kitty litter material achieves both of these objectives to some degree, to most people the smell is still quite objectionable. Accordingly, many people change all of the kitty litter material in the litter box even through the cat may have only used the litter box once or twice. As a result, a lot of essentially unused kitty litter ends up being thrown out and, thus, is wasted.

In trying to solve the kitty litter wastage problem, a number of litter box arrangements have been developed which separate the pet's solid waste matter or excrement from the granular kitty litter material. Many of these devices are kitty litter sifting devices which sift the kitty litter from the solid pet excrement. Such devices are disclosed in U.S. Pat. Nos. 4,505,226 to Carlson; 4,359,966 to Casino; 4,325,822 to Miller; 4,217,857 to Geddie; 3,908,597 to Taylor; 3,796,188 to Bradstreet and 3,141,441 to Russell.

Another interesting pet waste disposal device is disclosed in U.S. Pat. No. 4,047,499 to Janecek. The Janecek device has an intermediate resilient portion which is folded to form a pouring channel for disposing of the waste matter having been deposited on the device. While interesting, this device does not sift litter material from the waste. Accordingly, this device would result in the wastage of a lot of kitty litter material.

While all of the devices disclosed in the aforementioned patents undoubtedly work as intended, there still remains a need for a device which not only sifts kitty litter from pet excrement but is also easy to use. Such a device would also preferably sift the kitty litter material from the pet excrement very quickly. In addition, such a device would preferably be very easy to reinstall in the litter box after it has been used.

DISCLOSURE OF THE INVENTION

The present invention addresses the aforementioned needs by providing an animal waste collection and disposal device which is used with granular kitty litter material and which fits within a litter box. The device separates the kitty litter material from the animal's waste matter, thereby saving much of the kitty litter material which typically is disposed of along with the animal's waste matter.

The device includes two first and second sections, each of which is provided with apertures that are sized and configured to permit the passage of granular litter material but substantially prevent the passage of the animal's waste matter. The device also includes a unique connecting means for pivotally and slidably connecting the first section to the second section so that the sections are capable of pivoting relative to each other between an open position and a closed position and slidably moving relative to each other between the closed position and a third position, i.e., a waste matter dumping position.

In a preferred embodiment of the invention, the first and second sections are generally rectangularly shaped and provided with a plurality of spaced, parallel extending ribs. The ribs are spaced from each other to define the aforementioned apertures which are referred to in this embodiment as slits. The preferred embodiment also includes handle means attached to the first and second sections for grasping the device to facilitate pivotal and slidable movement of the sections between the three operating positions of the device, i.e., the open, closed and waste matter dumping positions.

To use the device in accordance with the present invention, one first locates the device in the litter box with the device positioned in its open position. Granular litter material is then poured onto the device to cover the device's apertures, i.e., or its slits. The device is now ready for use by the pet.

After the pet has deposited its waste matter onto the litter material covering the apertures, the first and second sections of the device are pivoted to position the device in the closed position. The device is then agitated so that the granular litter material in the device falls through the device's apertures into the litter box. The device is then moved to a disposal site for disposing of the animal waste matter.

To dispose of the animal waste matter, the first and second sections of the device are slidably moved relative to each other from the closed position to the waste matter dumping position. The device is then positioned or oriented so that gravity causes the animal waste matter to fall out of the device into the disposal site, typically a garbage bag. The device is then returned to the litter box and repositioned therein so that the kitty litter material covers the apertures, i.e., slits of the device. The device is preferably repositioned by pressing downwardly against the kitty litter material and by moving the device back and forth laterally in the litter box so that the kitty litter material is forced upwardly through the apertures of the device to cover or hide the apertures.

BRIEF DESCRIPTION OF THE DRAWINGS

Other features of this invention will appear in the following description and appended claims reference being made to the accompanying drawings forming a part of the specification where like reference characters designate corresponding parts and the views.

BEST MODE FOR CARRYING OUT THE INVENTION

Figures 1, 2, 3:
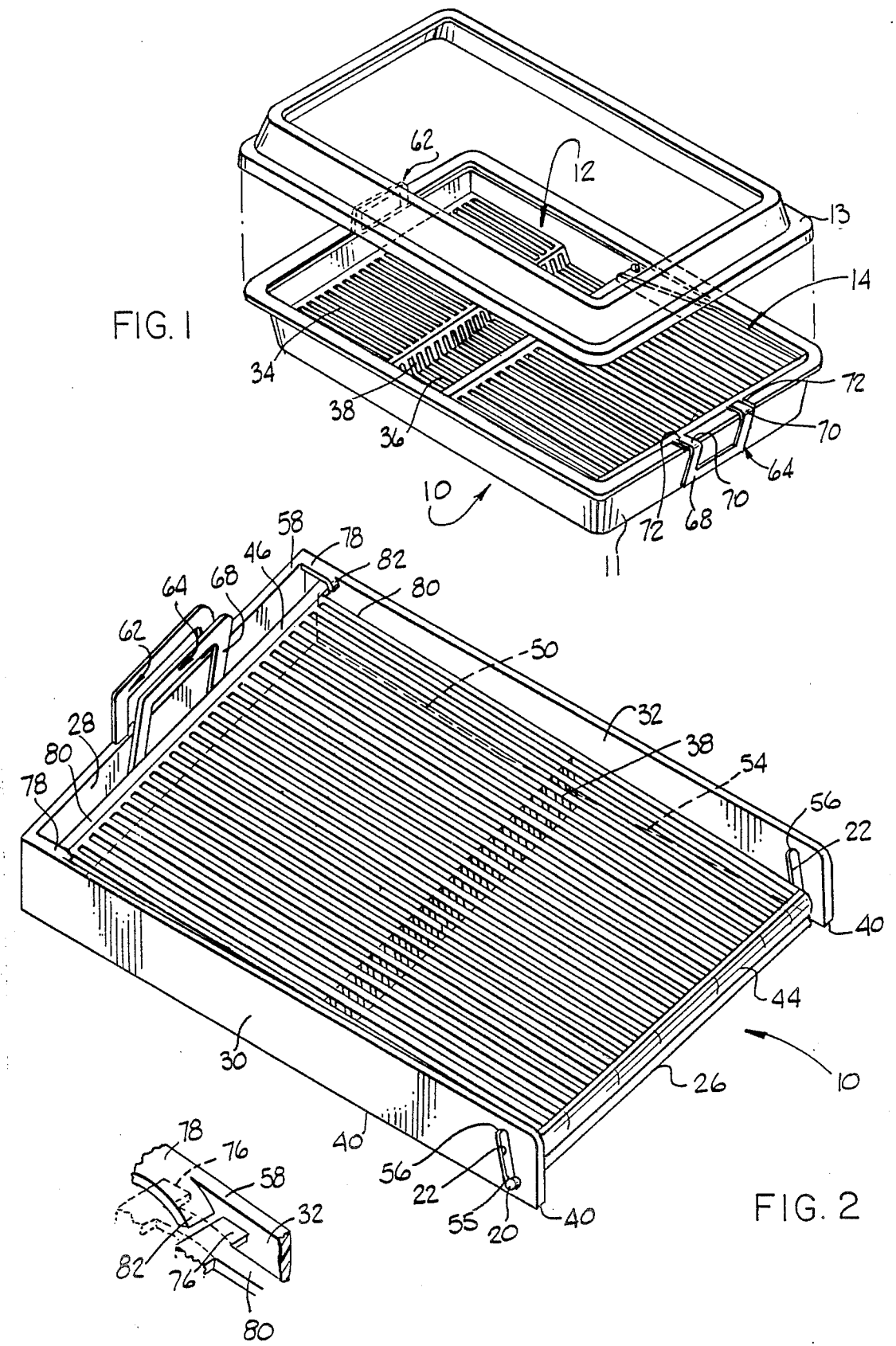
FIG. 1 is a perspective view showing the device of the present invention positioned in its open position in a litter box of the present invention.
FIG. 2 is a perspective view of the device showing the device in its closed position.
FIG. 3 is an enlarged, partial view of the locking means of FIG. 2.

FIGS. 1 through 6 illustrate an animal waste collection and disposal device 10 of the present invention for separating solid animal waste matter (i.e., pet excrement) from granular litter material also referred to herein as kitty litter. In FIG. 1, device 10 is located in a litter box 11 which has a conventional litter retaining edge 13 which prevents litter material from being kicked out of box 11 by an animal, typically a cat, which typically occurs when the animal digs into the litter material.

As illustrated, device 10 includes first and second generally rectangularly shaped sections 12 and 14, each of which is provided with a bottom (not numbered) having a plurality of spaced, parallel and longitudinally extending ribs 16 that define a plurality of spaced, parallel and longitudinally extending slits 18. While this embodiment of the present invention utilizes slits 18, it will be appreciated that any type of aperture will suffice in accordance with the present invention as long as the selected aperture is sized and configured to permit the passage of kitty litter material but substantially prevent the passage of solid waste matter.

Figure 4:
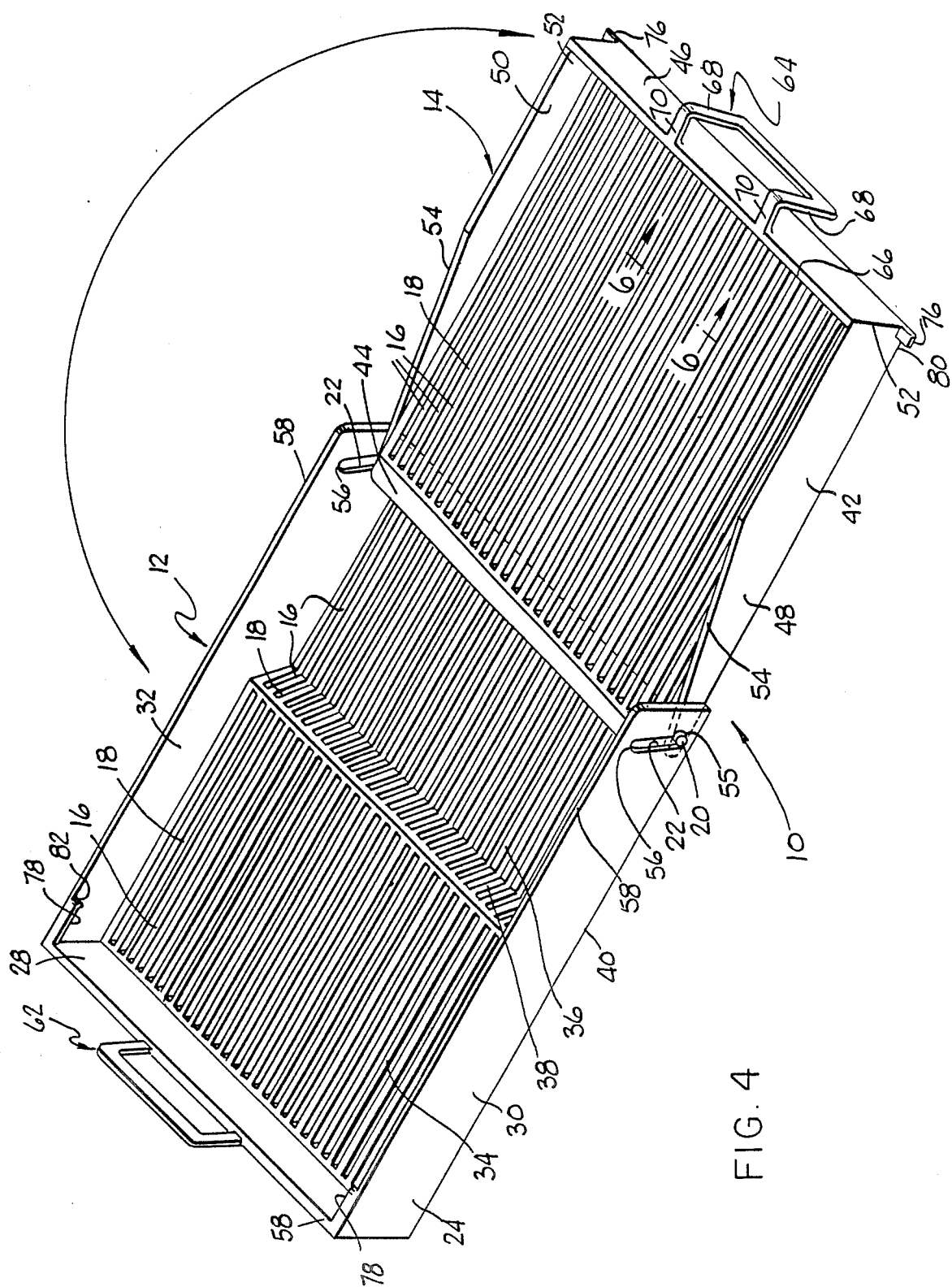
FIG. 4 is a perspective view of the device of the present invention positioned in its open position.
Figure 5:
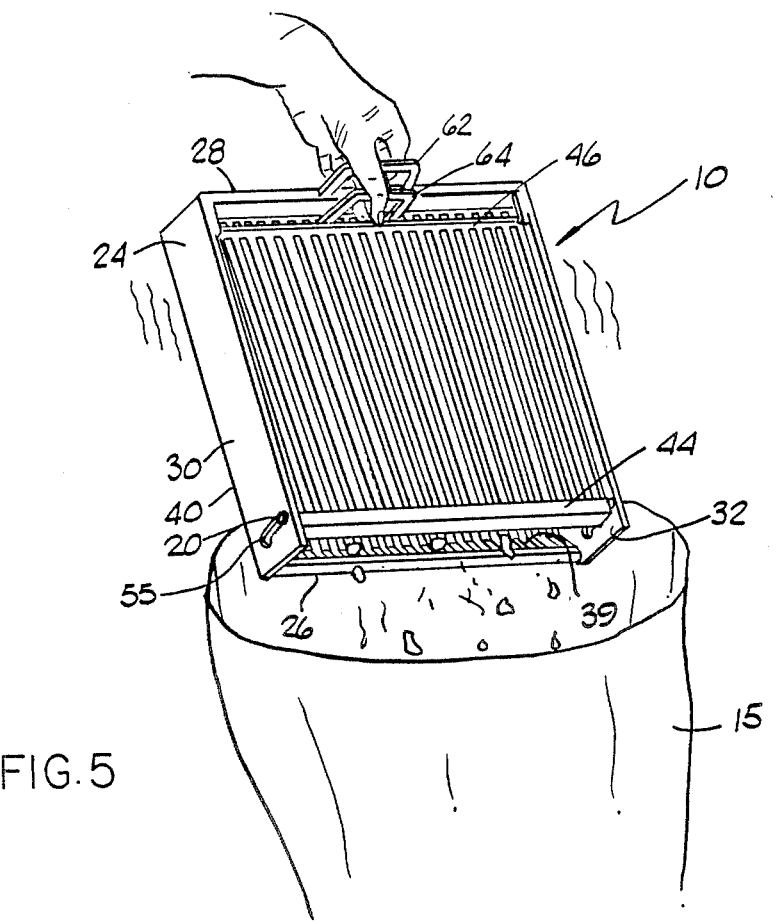
FIG. 5 is a perspective view of the device of the present invention positioned in its waste matter dumping position above a bag provided for disposal of waste matter being dumped from the device.

Returning to the drawings, it can be seen that device 10 also includes connecting means for pivotally and slidably connecting the first and second sections 12 and 14 together. Sections 12 and 14 are pivotally connected together so that they are capable of pivoting relative to each other between an open position and a closed position. FIGS. 1 and 4 illustrate sections 12 and 14 in the open position wherein it can be seen that the sections are positioned in a substantially end to end relationship. Sections 12 and 14 are slidably connected to each other so that they are capable of being slidably moved relative to each other between the closed position and a waste matter dumping position. FIG. 2 illustrates sections 12 and 14 in the closed position wherein it can be seen that section 14 has been pivoted approximately 180 degrees so that it substantially overlaps section 12. FIG. 5 illustrates sections 12 and 14 in the waste matter dumping position wherein it can be seen that solid waste matter is being dumped from the device into a bag 15 which is provided for the disposal of the waste matter. The details of the connecting means will be discussed in more detail below. However, a better understanding of the invention will be gained by explaining now that the primary components of the connecting means include a pair of axially aligned, cylindrical pins 20 and a pair of axially aligned, elongated slots 22. Slots 22 are sized and configured to contain pins 20 and permit pins 20 to both pivot and slide therein.

Turning now to the details of first section 12, FIGS. 2 and 4 illustrate that section 12 has a generally rectangularly shaped frame 24. Frame 24, in turn, has an open first end 26, a closed rectangularly shaped second end 28 and two opposing, generally rectangularly shaped sides 30 and 32, each of which adjoins an edge of a closed second end 28 and each of which extends therefrom to open first end 26.

Frame 24 bounds and serves to support four sections of ribs 16; i.e., a raised section 34 of ribs, a lower section 36 which is essentially parallel to raised section 34, a slanted connecting section 38 which connects parallel sections 34 and 36 together and a slanted mouth section 39 which adjoins lower section 36 and open first end 26 of frame 24. As illustrated, raised section 34 adjoins the frame's closed second end 28 and opposing sides 30, 32 at the middle or the midsection of the closed end and the opposing sides. In contrast, lower section 36 adjoins the frame's open first end 36 and sides 30, 32 along the bottom edges 40 thereof. Slanted sections 38 and 39 along with lower ribbed section 36 form the device's main pet waste collecting zone.

Turning now to second section 14, FIG. 4 illustrates that section 14 also has a generally rectangularly shaped frame 42. Moreover, as with frame 24, frame 42 has an open first end 44, a closed rectangularly shaped second end 46 and two opposing sides 48 and 50. However, unlike sides 30 and 32 of the first section, sides 48 and 50 are not rectangular. Instead, each side 48 and 50 has a square end 52 adjoining closed end 46 and a tapered end 54 adjoining open end 44. Tapered ends 54 serve to facilitate pivotal movement of section 14 onto section 12, as will be described in more detail below.

As with frame 24, frame 42 of section 14 also bounds and serves to support ribs 16 of the second section which, as best seen in FIG. 4, all lie in a single section, unlike the multi-sectioned bottom of frame 24. It will also be appreciated that frame 42 is slightly smaller than frame 24 so that it is capable of fitting within frame 24 when sections 12 and 14 are in the closed and dumping positions as illustrated in FIGS. 2 and 5.

Turning now to the details of the connecting means, it can be seen that cylindrical pins 20 project outwardly from the exterior surfaces of sides 48, 50 at a location adjacent first open end 44 of section 14. It can also be seen that elongated slots 22 extend through sides 30, 32 of section 12 at a location adjacent first open end 26 thereof. In addition, as best seen in FIG. 2, each elongated slot has an offset lower end 55 adjacent bottom edge 40 and an upper end 56 adjacent a top edge 58 of frame 24. The offset nature of lower ends 55 facilitates pivoting of sections 12 and 14 by providing a pocket-like area in which pins 20 can rotate. The offset nature also serves to prevent pins 20 from inadvertently sliding upwardly to ends 56. Those skilled in the art will appreciate that the effect of this is to prevent sections 12 and 14 from inadvertently sliding to the dumping position when sections 12 and 14 are positioned in the closed position. Accordingly, one desiring to empty the device will be able to move it without having to worry about the sections accidentally sliding from the closed position to the dumping position. Further details on the device's operation are discussed below.

Elongated slots 20 are also angled or tilted as best illustrated in FIG. 2 so that their upper ends 56 are located closer to the geometric center of sides 30, 32 than offset lower ends 55. Moreover, the angle is such that line drawn parallel to the longitudinal axis of the slots preferably forms an included angle of between about 75 and 85 degrees when measured from bottom edge 40. This angle facilitates slidable movement of sections 12 and 14 between the closed and the dumping positions as will be explained in more detail below.

Device 10 is also provided with handles 62 and 64 which are attached, respectively, to sections 12 and 14. Handles 62, 64 enable one to grasp device 10 and pivotally and slidably move sections 12 and 14 as will be described below. Handle 62 projects outwardly from top edge 58 of the closed end 28 of first section 12. It also lies in the same plane as closed end 28.

In contrast, handle 64 projects outwardly from top edge 66 of section 14 at a right angle. Handle 64 also has a downwardly depending portion 68 which depends downwardly at a right angle from that portion of handle 64, i.e., portion 70 which projects outwardly from top edge 66.

In FIG. 1, it can be seen that litter box 11 is provided with two grooves 72 for receiving portion 70 of handle 64. While not essential to the present invention, the insertion of portion 70 into grooves 72 serves to stabilize device 10 within box 11. Groove 72 also contains portion 70 of handle 64 so that it will not interfere with the attachment of retaining edge 13 to the litter box. At this point, it should be noted that while device 10 is preferably used with a custom design litter box having grooves 72 such as box 11, device 10 may in accordance with the present invention be used with any type of receptacle for containing kitty litter as long as the receptacle is large enough to contain device 10.

Device 10 also has a locking means (not numbered) for preventing sections 12 and 14 from pivoting to the open position when they are positioned in the closed position (see FIGS. 2-4). The locking means includes a pair of axially aligned tabs 76 and a pair of aligned lips 78. Tabs 76 project outwardly from the exterior surfaces of sides 48 and 50 of section 14 at a location which is adjacent to both the bottom edge 80 of the sides and closed end 46 of section 14. Aligned lips 78 project inwardly from the interior surfaces of sides 30 and 32 of section 12 at a location which is both adjacent to closed end 28 of section 12 and which is flush with top edge 58 of section 12. Lips 78 are sized and configured to enable tab 78 to be snapped under the lips when sections 12 and 14 are pivoted into the closed position. Lips 78 are also sized and configured (i.e., provided with a downwardly curved portion 82) to prevent tab 78 from slipping out from under the lips once the tabs are snapped thereunder. As such, lips 78 prevent sections 12 and 14 from pivoting freely to the open position. Lips 78 are also provided with a length which enables the tabs to slide and thus be held against the underside edges (not numbered) of the lips as sections 12 and 14 are slidably moved between the closed and the waste matter dumping position. Accordingly, the lips prevent sections 12 and 14 from pivoting to the open position as such slidable movement takes place. It will also be appreciated that lips 78 cooperate with offset ends 55 to prevent sections 12 and 14 from inadvertently sliding to the dumping position from the closed position, as previously mentioned.

Figure 6:
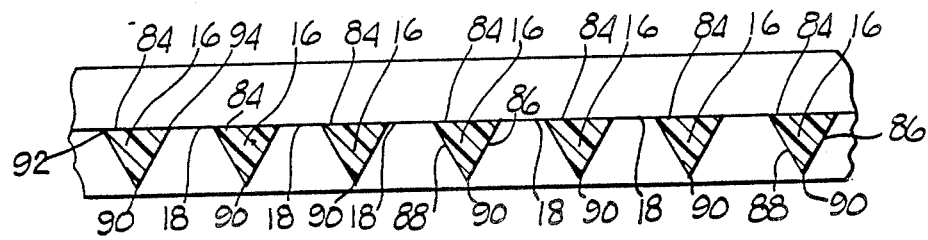
FIG. 6 is a partial cross sectional view taken along Lines 6—6 of FIG. 4.

Turning now to the details of ribs 16, it can be seen in FIG. 6 that ribs 16 are triangularly shaped and cross sectioned so that each rib has three sides 84, 86 and 88 and three edges 90, 92 and 94 wherein each edge adjoins two sides of the rib. The edges 90 of the ribs of each section (i.e., sections 34, 36, 38 and 14) all face downwardly while sides 84 of the ribs of each section face upwardly. In addition, all sides 84 of each section lie in the same plane as do all edges 90 of each section. The rib's triangular shape is important in accordance with the present invention because it facilitates movement of kitty litter material up through slits 18 located between the ribs, as will be described in more detail below.

To use device 10 of the present invention, one first locates device 10 in litter box 11 with the device positioned in its open position, as such is illustrated in FIG. 1. As previously mentioned, in the open position sections 12 and 14 are in a substantially end to end relationship, i.e., sections 12 and 14 abut one another at their respective open ends, i.e., open end 26 and open end 44. When locating device 10 in box 11, portion 70 of handle 64 should also preferably be located or positioned in grooves 72 of box 11, as previously mentioned.

An amount of kitty litter material is then poured into the device 10 which is sufficient to substantially cover the device's, ribs 16 and slits 18. The device is now ready for use by the pet.

After a pet has deposited waste matter in the litter box, sections 12 and 14 are pivoted relative to each other to position the device in the closed position (see FIG. 2). In the illustrated embodiment, such pivotal movement is typically carried out by pivoting section 14 onto section 12. This causes the solid waste material having been deposited on section 14 to fall onto the lower ribbed section 36 of the device, which lower section is the device's main collecting zone for waste matter. The litter material on section 14 falls through section 14's slits 18 into litter box 11 as such pivoting takes place.

After section 14 is pivoted onto section 12, section 14 is then pushed downwardly until tabs 76 snap under lips 78. As previously mentioned, this snapping action serves to lock sections 12 and 14 in the closed position. Device 10 is then preferably raised slightly within box 11 and agitated or lightly shaken so that most of the kitty litter material contained in the device falls through the device's slits 18 into the litter box.

Device 10 is now moved to a site for the disposal of the animal waste matter, such as bag 15 illustrated in FIG. 5. To dispose of the waste, handles 62 and 64 are preferably grasped with one hand and squeezed. Such squeezing pulls the handles together so that they are substantially parallel to each other. The squeezing action also causes sections 12 and 14 to slidably move from the closed position to the waste matter dumping position which results in the slidable movement of pins 20 from their position in the slot's offset lower ends 55 to the slot's upper ends 56. This movement also causes open end 44 of section 14 to move upwardly away from open end 26 of section 12, as such forming an opening (not numbered) through which waste matter contained in the device may pass. Accordingly, to empty device 10 of the waste matter, one simply tilts the device so that gravity causes the collected waste matter to fall out through the opening into a disposal site such as the mouth of bag 15 illustrated in FIG. 5.

After disposing of the waste matter, device 10 is returned to the litter box and repositioned therein so that the kitty litter material remaining in the box once again covers the device's ribs and slits. Such repositioning of the device is provided by pressing downwardly on the device against the kitty litter material and by moving the device back and forth laterally while pressing downwardly. This action forces the kitty litter material upwardly through the device's slits and this action is continued until the device's ribs are covered with kitty litter. The previously mentioned triangular, cross sectional shape of the ribs facilitates such upward movement of the litter material through slits 18.

With the device repositioned in the litter box as described, the device is ready to be reused by the pet. It may be necessary after several uses of the device to add more kitty litter material to the litter box inasmuch as some litter material will be dumped out with the pet's waste matter every time the device is used. Moreover, after a period of time it will be necessary to completely change the litter material. It will be appreciated, however, that the present invention results in much longer intervals between such changes, thereby wasting much less kitty litter material.

Although the present invention has been described with a certain degree of particularity, it is understood that the present disclosure has been made by way of example and that changes in details of structure may be made without departing from the spirit thereof.

I claim:

1. An animal waste collection and disposal device for separating animal waste matter from granular litter material, said device comprising:
   a first section;
   a second section, said first and second sections also having apertures which are sized and configured to permit the passage of the granular litter material but substantially prevent the passage of the waste matter; and
   connecting means for pivotally and slidably connecting said first section to said second section so that said first and second sections are capable of pivoting relative to each other between an open position and a closed position and slidably moving relative to each other between the closed position and a waste matter dumping position.

2. The device as claimed in claim 1 further comprising handle means attached to said first and said second sections for grasping said device to facilitate pivotal movement of said first and second sections between the open and closed positions and to facilitate slidable movement of said first and second sections between the closed and the dumping positions.

3. The device as claimed in claim 1 wherein said first and second sections are generally rectangularly shaped and provided with a plurality of spaced, parallel extending ribs, said ribs being spaced from each other so as to define said apertures, said apertures thereby also being spaced from each other and extending parallel to each other so as to comprise a plurality of spaced, parallel extending slits.

4. The device as claimed in claim 3 wherein said ribs are triangularly shaped in cross section so that each rib has three sides and three edges wherein each edge adjoins two sides of the rib, each of said ribs further being oriented with respect to its respective section so that a first edge of said three edges of each rib faces downwardly and a first side of said three sides of each rib faces upwardly, said first sides of said ribs of each said section also being oriented so as to lie in a first plane, said first edges of said ribs of each said section also being oriented so as to lie in a second plane which is parallel to the first plane.

5. The device as claimed in claim 1 wherein said device includes locking means for preventing said first and second sections from pivoting to the open position when said first and second sections are positioned in the closed position.

6. The device as claimed in claim 2 wherein said first and second sections are slidably moved from the closed position to the dumping position by squeezing said handle means attached to said first and second sections.

7. The device as claimed in claim 6 wherein said handle means includes a first handle attached to said first section and a second handle attached to said second section, said handles being attached to their respective sections so that said handles form an included angle of between about 5 to 15 degrees when said first and second sections are in the closed position.

8. The device as claimed in claim 7 wherein said handles are substantially parallel to each other when said first and second sections are in the dumping position.

9. The device as claimed in claim 1 wherein each of said first and second sections has a generally planar apertured bottom defining said apertures and wherein said apertured bottoms form an included angle of about 180 degrees when said first and second sections are in the open position and an included angle of about 0 degrees when said first and second sections are in the closed position.

10. The device as claimed in claim 1 wherein said first section includes a generally rectangularly shaped first frame having an open first end, a closed, rectangularly shaped, second end and two opposed, generally rectangularly shaped sides, each of which adjoins an edge of said closed second end and each of which extends therefrom to said open first end, said first section also having an apertured bottom extending between said sides and said ends of said first frame, said apertured bottom defining said apertures; and
   wherein said second section includes a generally rectangularly shaped second frame having an open first end, a closed, rectangularly shaped second end and two opposing sides, each of said sides having a square end and a tapered end, said square ends adjoining said closed end and said tapered ends adjoining said open end, said second section also having a apertured bottom defining said apertures which extends between said sides and said ends of said second frame, said second frame also being sized and configured to fit within second first frame when said first and second sections are in the closed and the dumping positions; and
   wherein said connecting means includes a pair of axially aligned cylindrical pins which project outwardly from the exterior surface of said sides of said second section at a location adjacent said first open end of said second section and wherein said connecting means also includes a pair of axially aligned elongated slots which extend through said sides of said first frame at a location adjacent said first open end of said first section, said slots being sized and configured so that said cylindrical pins are capable of pivotable and slidable movement in said slots so that said first and second sections are capable of pivoting relative to each other between the open and the closed positions and sliding relative to each other between the closed and the dumping positions.

11. A device as claimed in claim 10 wherein each of said elongated slots has a lower end adjacent the bottom edge of said side said slot extends through and an upper end adjacent the top edge of said side said slot extends through, said upper ends of said slots being located closer to the geometric center of said sides than said lower ends of said slots, said slots also being angled so that a line parallel to the longitudinal axis of said slots forms an included angle of between about 75 and 85 degrees when measured from a line extending parallel to the bottom edge of said sides.

12. The device as claimed in claim 10 wherein said apertured bottom of said first section has a raised section adjacent said closed second end and a lower section adjacent said open first end, said lower section adjoining said open first end and said opposed sides at said bottom edge of said open end and said opposing sides, said raised section adjoining said closed second end and said opposing sides at the midsection of said closed end and said opposing sides, said raised section and said lowered section being generally parallel to each other and being connected to each other by an apertured connecting section.

13. A device as claimed in claim 10 wherein said second section includes a pair of axially aligned tabs which project outwardly from the exterior surface of said sides of said second section at a location adjacent said bottom edge of said sides and said closed second end of said second section, and wherein;
said first section includes a pair of parallel, axially aligned lips which project inwardly from the interior surface of said sides of said first section at a location adjacent said closed end of said first section along the top edge of said sides of said first section, said lips being sized and configured to enable said tabs to be snapped under said lips when said first and said second sections are pivoted into the closed position, said lips also being sized and configured to prevent said tabs from slipping out from under said lips when said tabs are snapped under said lips, said lips thereby preventing said first and second sections from pivoting freely to the open position, said lips also being provided with a length which enables said tabs to slide against the underside edges of said lips as said first and second sections are slidably moved between the closed position and the waste matter dumping position, said lips thereby holding said tabs under said lips as such slidable movement takes place, thereby preventing said first and said second sections from pivoting to the open position as such slidable movement takes place.

14. An animal waste collection and disposal apparatus, said apparatus comprising:
a litter box; and
a device for separating animal waste matter from granular litter material, said device being sized and configured to fit and be operable within said litter box, said device including:
a first section;
a second section, said first and second sections also having apertures which are sized and configured to permit the passage of the granular litter material but substantially prevent the passage of the waste matter; and
connecting means for pivotally and slidably connecting said first section to said second section so that said first and second sections are capable of pivoting relative to each other between an open position and a closed position and slidably moving relative to each other between the closed position and a waste matter dumping position.

15. An animal waste collection and disposal apparatus as claimed in claim 14 wherein said device includes a handle attached to one of said first and second sections and wherein said litter box has an upright side wall which is bounded by an upper edge and wherein said upper edge defines grooves for receiving said handle of said device to stabilize said device in said litter box.

16. A method of separating animal waste matter from granular litter material and disposing of the waste matter, said method comprising:
providing an animal waste collection and disposal device including:
first and second sections, each of which has apertures which are sized and configured to permit the passage of the granular litter material but substantially prevent the passage of the waste matter; and
connecting means for pivotally and slidably connecting the first section to the second section so that the first and second sections are capable of pivoting relative to each other between an open position and a closed position and slidably moving relative to each other between the closed position and a waste matter dumping position;
providing a litter box which is sized and configured to contain the device when the device is positioned in the open position;
locating the device in the litter box with the device positioned in the open position;
pouring granular litter material onto the device located in the litter box until the device's apertures are substantially covered with the litter material;
depositing animal waste matter onto the litter material in the device;
pivoting the first and second sections relative to each other to position the device in the closed position;
agitating the device so that the granular litter material in the device falls through the device's apertures into the litter box and continuing said agitating until the device primarily contains animal waste matter;
moving the device positioned in the closed position and containing primarily animal waste matter to a site for the disposal of the animal waste matter;
slidably moving the first and second sections relative to each other from the closed position to the waste matter dumping position; and
while in the waste matter dumping position, positioning the device so that the animal waste matter falls out of the device under the action of gravity into the disposal site.

17. A method as claimed in claim 16 further comprising:
returning the device to the litter box containing the granular litter material; and
repositioning the device in the litter box so that the granular litter material substantially covers the apertures of the device.

18. A method as claimed in claim 16 wherein the device is repositioned in the litter box by pressing the device downwardly against the granular litter material and by moving the device back and forth laterally in the litter box so that the granular litter material is forced upwardly through the apertures of the device to cover the apertures.

19. A method as claimed in claim 16 wherein said step of slidably moving the first and second sections is provided by grasping handles attached to each of the first and second sections; and
squeezing the handles so that they are drawn together to slidably move the first and second sections from the closed position to the dumping position.

* * * * *